US010740969B2

(12) United States Patent
Falstrup et al.

(10) Patent No.: US 10,740,969 B2
(45) Date of Patent: *Aug. 11, 2020

(54) LAYERED PANORAMAS FOR VIRTUAL REALITY (VR)

(71) Applicant: EVOX Productions, LLC, Rancho Dominguez, CA (US)

(72) Inventors: David Falstrup, Rancho Dominguez, CA (US); Ryan Murray, Los Angeles, CA (US); Alex McClain, Los Angeles, CA (US); Pat Hadnagy, Los Angeles, CA (US); Thom Denick, Los Angeles, CA (US); Claudia Nefately Ambriz, Pomona, CA (US)

(73) Assignee: EVOX Productions, LLC, Rancho Dominguez, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,664

(22) Filed: Jun. 4, 2019

(65) Prior Publication Data

US 2019/0287303 A1  Sep. 19, 2019

Related U.S. Application Data

(63) Continuation of application No. 15/223,638, filed on Jul. 29, 2016, now Pat. No. 10,311,636.

(60) Provisional application No. 62/270,537, filed on Dec. 21, 2015.

(51) Int. Cl.
*H04N 7/18* (2006.01)
*G06T 19/00* (2011.01)
*G06F 3/0484* (2013.01)
*G06F 3/0485* (2013.01)
*G06F 3/0481* (2013.01)
*H04N 5/232* (2006.01)
*H04N 13/117* (2018.01)

(52) U.S. Cl.
CPC .......... *G06T 19/003* (2013.01); *G06F 3/0485* (2013.01); *G06F 3/04815* (2013.01); *G06F 3/04845* (2013.01); *H04N 5/23238* (2013.01); *H04N 13/117* (2018.05); *G06T 2219/2008* (2013.01)

(58) Field of Classification Search
CPC .................................................... G06T 19/003
USPC ........................................................... 348/38
See application file for complete search history.

(56) References Cited

U.S. PATENT DOCUMENTS

| 10,148,875 B1* | 12/2018 | Chen ..................... H04N 21/637 |
| 2004/0223051 A1* | 11/2004 | Peleg .................... H04N 13/282 348/53 |
| 2010/0265171 A1* | 10/2010 | Pelah ..................... A63F 13/00 345/157 |

(Continued)

*Primary Examiner* — Leron Beck
(74) *Attorney, Agent, or Firm* — SoCal IP Law Group LLP; Mark Andrew Goldstein

(57) ABSTRACT

A method for the production of immersive virtual reality experiences designed for viewing in virtual reality head-mounted displays (HMD). This unique layered panorama process is a cubic or spherical mapped content method for presentation of pre-rendered images viewed from a fixed point of view in a head mounted display for virtual reality (VR) applications, a method that by mapping/layering all visual elements onto a mono or stereoscopic spherical or cubic panorama surface creates a seamless visual integration.

14 Claims, 13 Drawing Sheets

(56) References Cited

U.S. PATENT DOCUMENTS

| | | | | |
|---|---|---|---|---|
| 2011/0018964 | A1* | 1/2011 | Krishnan | G02B 13/06 |
| | | | | 348/36 |
| 2012/0105574 | A1* | 5/2012 | Baker | G03B 35/08 |
| | | | | 348/36 |
| 2014/0307045 | A1* | 10/2014 | Richardt | H04N 5/23238 |
| | | | | 348/36 |
| 2015/0341704 | A1* | 11/2015 | Choi | H04N 21/632 |
| | | | | 725/81 |
| 2016/0012855 | A1* | 1/2016 | Krishnan | G11B 27/105 |
| | | | | 386/241 |
| 2016/0286208 | A1* | 9/2016 | Drouin | H04N 13/194 |
| 2016/0352982 | A1* | 12/2016 | Weaver | H04N 5/23238 |
| 2016/0353089 | A1* | 12/2016 | Gallup | G02B 27/0172 |
| 2017/0187955 | A1* | 6/2017 | Fink | H04N 5/247 |

* cited by examiner

LAYERED PANORAMAS FOR VIRTUAL REALITY (VR)

RELATED APPLICATION INFORMATION

This patent is a continuation of patent Ser. No. 10/311,636, titled "LAYERED PANORAMAS FOR VIRTUAL REALITY (VR)" issued Jun. 4, 2019. This patent also claims priority from provisional patent application No. 62/270,537 filed on Dec. 21, 2015

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The present invention relates to the field of photography and virtual reality. In particular, the present invention is in the field of enabling an individual to virtually view the interior and exterior of a vehicle.

Description of the Related Art

The present inventors are not aware of any specific previous issued patent or published patent application which is the same as or similar to the present invention. To the best of the present inventors' knowledge, the invention as set forth in this patent application is useful, novel and non-obvious in accordance with the definitions of United States patent law.

SUMMARY OF THE INVENTION

The present invention is a method for the production of immersive virtual reality (VR) experiences designed for viewing in virtual reality head-mounted displays (HMD). This unique layered panorama process is a cubic or spherical mapped content method for presentation of pre-rendered images viewed from a fixed point of view in a head mounted display for VR applications. This panoramic layering method creates a seamless visual integration.

Specifically, this invention is for panoramic images that are layered on top of each other than enables the layered panoramic images to be viewed interactively when a user views this photography while using a virtual head mounted display.

The present invention utilizes apparatus and software to create a method that by mapping/layering all visual elements onto a mono or stereoscopic spherical or cubic panoramic surface creates a seamless visual integration.

This novel approach takes assets produced from different sources and at different times and provides a method to combine them into a holistic, immersive experience that appears as a unified, complete world. The novel approach places the viewer/user in a fixed Point Of View (POV) perspective to experience environments and objects placed within that environment. The placement of two (2) dimensional images onto a panoramic surface (typically cube or sphere), surrounding the user is novel since all "objects" or "elements" are placed onto the surface regardless of its apparent distance from the user, and this approach is applied to creation of virtual "worlds" for viewing in HMDs. Both left and right eye images are warped to fit into the panorama, allowing the image elements seen by the user to appear to be at different distances from the user. The visual effects are substantially the same as the effect from placement of 3D objects in a 3D scene at varying distances from the user. Likewise, objects can appear to move in the apparent 3D space by creating animated frame sequences for left and right eye, warped appropriately to fit the background scene. Images may be layered on top of each other, with frame transparency and each are able to appear to be at different distances, with corresponding different left-right eye separation.

The present invention also includes a useful, novel, and non-obvious method for layering three dimensional (3D) elements and two dimensional (2D) elements on to panoramic photography for interaction by a user within a virtual realty head mounted display. These elements can be layered in both interior panoramas of a car or vehicle (Car and vehicle will be used interchangeably throughout this patent application) and exterior panoramas of a vehicle. In use, three-dimensional automotive vehicle images provide a 360 degree view of an entire exterior or interior of an automotive vehicle with selectable elements super imposed within this virtual realty powered by a virtual reality head mounted display.

It is an object of the present invention to create stereoscopic panoramic photographic images of an entire automotive exterior and interior that has selectable elements or objects layered within the virtual realty.

It is a further object of the present invention to create the visual images on digital photography mediums which are enabled to be transferred via computer applications to be used in conjunction with a smartphone or other portable electronic device which is configured to be used in conjunction with viewing through a virtual reality head-mounted display.

It is a further object of the present invention to create a stereoscopic automotive exterior panoramic photographic image which is achieved through having a separate set of photographs when viewed by a person through a person's right eye and subsequently viewed by the same person when viewed through the person's left eye, to combine the two separate images into a final assembled and stitched together three-dimensional 360 degree image.

It is a further object of the present invention to create the stereoscopic automotive selectable elements within the exterior or interior panoramic photographic images to be used for viewing in virtual reality head-mounted displays.

It is still a further object of the present invention to create the finished completed three-dimensional 360 degree automotive exterior content through several steps which are integrated with each other to create the final product. The sub-components of the special steps include:

1. Creation of stereoscopic panoramic photography of automotive interiors, achieved through selection of special lensing, cameras and use of images of each eye to combine together interocular separation by creating photographs as viewed from a right eye of a human person and a second set of photographs as viewed from a left eye of a human person and combining the photographs taken as viewed from the right eye of the person and the photographs taken as viewed from the left eye of the person and combining them through the present invention interoccular separation to create a final optimal-interoccular display image of the entire vehicle exterior for subsequent transfer to a computer medium for incorporation into a computer software application downloadable to a portable electronic device such as a smartphone. The smartphone is used in conjunction with a virtual reality display through a head mounted display which is a headset with a pair of spaced apart arms respectively worn over the person's right and left ear or banded to encircle the back of a person's head with the smartphone working in conjunction and communicating through blue tooth or cable with the virtual realty display. The downloaded images in the smartphone are viewed through the headset with various activation members such as buttons on the headset pressed or otherwise activated by the person's fingers. The person looks at the removably attached smartphone through occular viewing members such as lenses in the headset to view the entire virtual images of the exterior of the vehicle or close-up views of selected areas of the exterior of the vehicle such as the steering wheel, the dashboard consol with instruments, one or both front seats, one or both rear seats or an entire rear seat if the rear seat is not separate bucket seats, etc.

2. In addition to receiving individual digital photographs of the exterior of the vehicle or other computer generated images of the exterior of the vehicle photographs of 360-degree views of the vehicle as viewed from a right eye and then a second matching set of photographs of 360-degree views of the exterior of the vehicle as viewed from the left eye and then combining the two images through a computer application utilized through a special methodology to combine or stitch the set of images together to create stereoscopic panoramic images of the automotive exterior to be viewed from a virtual reality display.

3. The present invention further includes post production of the stereoscopic panoramic images to ensure that all of the images are color matched throughout the entire three-dimensional 360-degree image and also are matching in content so that there is no overlap or visible seaming or stitching of one image to another, thereby giving the visual appearance of an entire exterior of the automobile without viewing any component which have been individually photographed and placed together with other components.

It is a further object of the present invention to create a unique visual content of the automotive exterior in both three dimensions and 360 degrees which is capable of being used in any head-mounted application or Sdk, including, but not limited to various virtual reality head-mounted displays, and other three-dimensional viewing devices which can be used in conjunction with a portable electronic device which receives all of the images through a computer download and then enables those images to be viewed when the portable electronic device is used in conjunction with a display member which is positioned so that the images on the portable electronic device can be viewed through the user's eyes, both with an individual eye with one eye closed and through both eyes for a stereoscopic virtual reality experience to examine the entire exterior of an automobile, truck or other moving vehicle.

It is an additional object of the present invention to have a method to create a process which utilizes pre-rendered images from a fixed point of view to enable product visualization and review, allowing the viewer to view the vehicle from all angles including front, back, sides, and top. The user will also have the ability to rotate the vehicle along the X-axis (axis running parallel with the floor) and view the vehicle at any desired position along this axis.

It is an additional object of the present invention to create a three-dimensional 360-degree virtual image of the entire exterior of a vehicle and to allow the user to view the vehicle within a showroom with the vehicle positioned on a raised slowly rotating platform.

It is an additional object of the present invention to create an environment that will allow the addition of two dimensional or three dimensional elements. These elements, as disclosed in the present invention, can be overlayed seemlessly onto the panorama images.

It is an additional object of the present invention to create a novel approach that takes assets produced from different sources and at different times and provides a method to combine them into a holistic, immersive experience that appears as a unified, complete world. The novel approach places the viewer/user in a fixed Point Of View (POV) perspective to experience environments and objects placed within that environment. The placement of 2 dimensional images onto a panoramic surface (typically cube or sphere), surrounding the user is novel since all "objects" are placed onto the surface regardless of its apparent distance from the user, and this approach is applied to the creation of virtual "worlds" for viewing in HMDs. Both left & right eye images are warped to fit into the panorama, allowing the image elements seen by the user to appear to be at different distances from the user. The visual effects are substantially the same as the effect from placement of 3D objects in a 3D scene at varying distances from the user. Likewise, objects can appear to move in the apparent 3 D space by creating animated frame sequences for left and right eye, warped appropriately to fit the background scene. Images may be layered on top of each other, with frame transparency and each are able to appear to be at different distances, with corresponding different left-right eye separation.

It is a further object of the present invention to have elements completely integrated and within the virtual world panoramic scene. The fact that the user can look around and interact with elements in the virtual world makes it very immersive while the fixed POV prevents any sensation of physically moving in a virtual world, an approach that is known to cause nausea and discomfort to many users.

It is sill another object of the present invention to create an immersive VR experience from a fixed point of view without needing to position all elements together in 3D space within a 3D environment, while still allowing for the correct perspective and placements of items in the experience to appear as if all separate items were indeed 3D objects placed in a 3D environment. This is done through a careful and systematic application of individually produced layered panoramic elements whereby the separate elements of the experience, for example a room, a vehicle in the room, graphic elements, GUI elements, photos, videos, etc., are produced to fit in layered panoramic images that, when created correctly and viewed in a VR experience, have the appearance of representing a 3D world with appropriate depth from a fixed perspective.

It is a further object of this invention to have elements produced to fit within the panoramic experience when brought together in VR application development, regardless of the application engine, such as Unity, Unreal Engine, or others. The development processes are outlined further in the VR Application Development Process below. In essence, the end results will look as if it's one panorama whereas in fact it's a base panorama of the environment with elements produced specifically and exactly to be layered on it for a seamless view. All visual items included in the experience must be produced with matching properties, such as camera angles, lighting, separation, stitching details" for elements to be matched, aligned or otherwise uniform to allow for proper combination of the elements into layers used to form a panoramic image in 3D VR space. This is achieved by:

1. Matching camera height, angle and relative lens diameter across all combined images: All images to be combined must be acquired from a camera or cameras at the same angle to the subject, at the same height to the subject, and using the same focal length lens.

2. Matching camera separation across all combined images: All images to be combined must be produced with the same separation between stereo cameras, down to the millimeter for best results 3. Matching lighting across all individually photographed and/or rendered elements: all images to be combined must be acquired under same or similar lighting conditions.

4. Matching stitching, placement and registration of all photographed, produced and/or rendered elements.

It is a further object of the present invention to provide a method for images to be combined such that when layered on top of each other, any panoramic stitching (blending of more than one image into a final image) and registration/placement (ensuring precise alignment for any spherical or cubic panorama) needs to match so that when combined, the total sum of images create one comprehensive panorama that makes sense. For example, a car produced separately from an environment should look like it is sitting on the floor in the correct position of the environment.

It is still a further object of this invention to provide a method that allows pre-rendering of image content which results in high quality and high resolution content with relatively low file size, low computing requirements, and low bandwidth requirements.

Panoramic layering as disclosed in this patent application also allows easy and repeatable exchange of background scenes and elements to facilitate integration of 2D elements that are more readily available and lower cost. Existing 2D elements can be converted to left and right eye stereo vision elements (ideally with drop shadows) and will appear as 3D objects even though they are 2D elements. This method allows for a fixed POV that promotes product review and evaluation for education, entertainment, product clinics, shopping consideration, etc. as it creates a unique ability to use pre rendered assets for high quality, product accurate and photo real display, including color changes and component/feature configuration, text, image and video overlays and use with other stereoscopic virtual reality content. This novel method does not limit the use of this unique content for viewing on any specific Virtual Reality Head Mounted Display, but is rather designed to be used in any HMD application and SDK. This process utilizes pre-rendered images from a fixed point of view to enable product visualization and review, allowing the viewer to feel like they are either in the car viewing it or next to the car viewing it.

Further novel features and other objects of the present invention will become apparent from the following detailed description, discussion and the appended claims, taken in conjunction with the drawings.

DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

I. Equipment Required for Utilization of the Present Invention Method and Corresponding Apparatus The following is a list of photographic equipment and related accessories which is the preferred equipment for use with the present invention. It is within the spirit and scope of the present invention to use similar, comparable or substitute equipment known to one skilled in the art as opposed to using the specific equipment and items set forth below. It will be appreciated that this is simply a recitation of the best method known to the inventors at the time this patent application was filed and is not intended to limit the course and scope of the specific equipment to achieve the new, novel and non-obvious results of the present invention.

Figure 1:
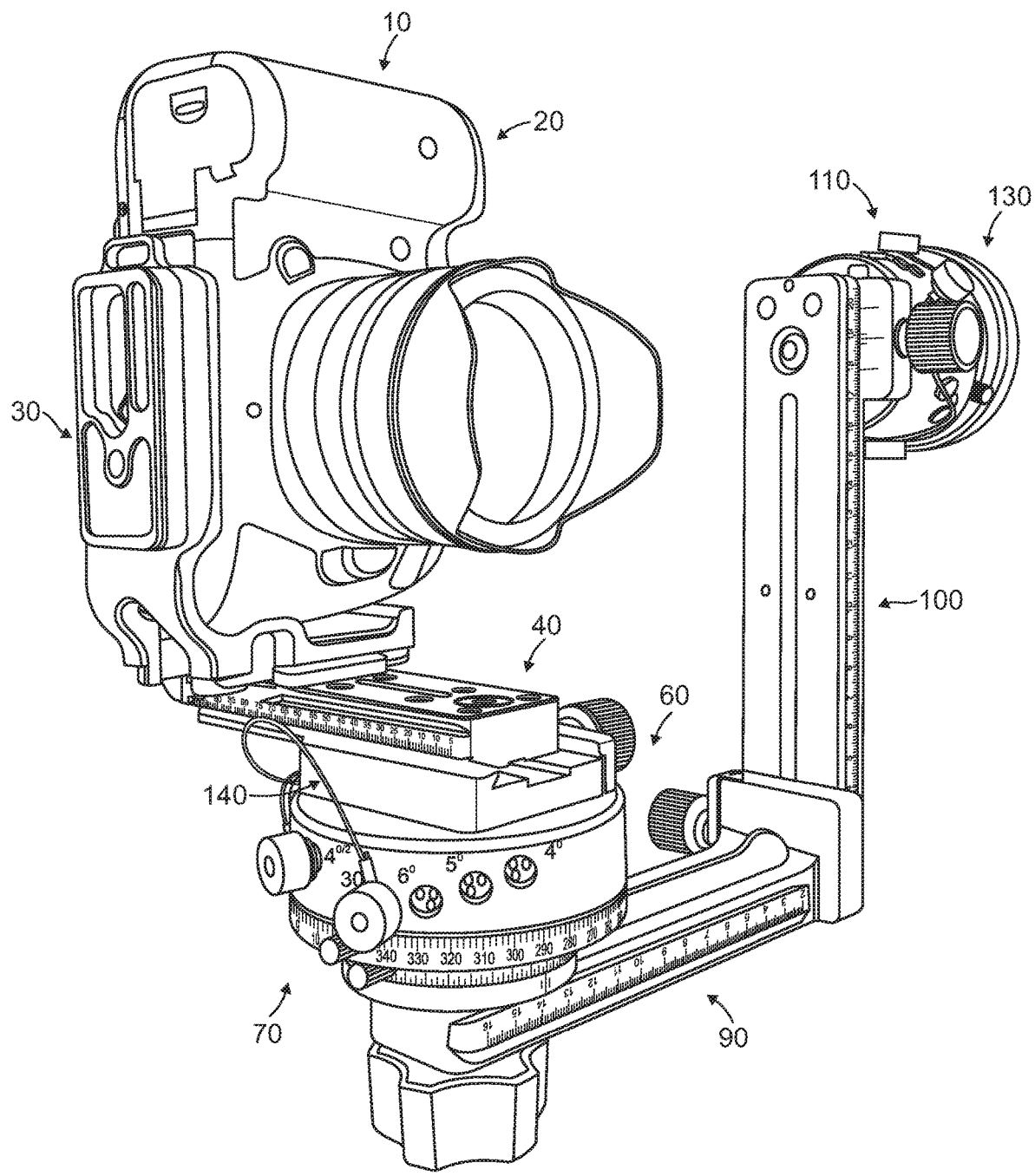
FIG. 1 is a perspective view of an assembled single camera stereo panoramic rig as one example of a portion of the apparatus used for the method of the present invention.
Figure 2A:
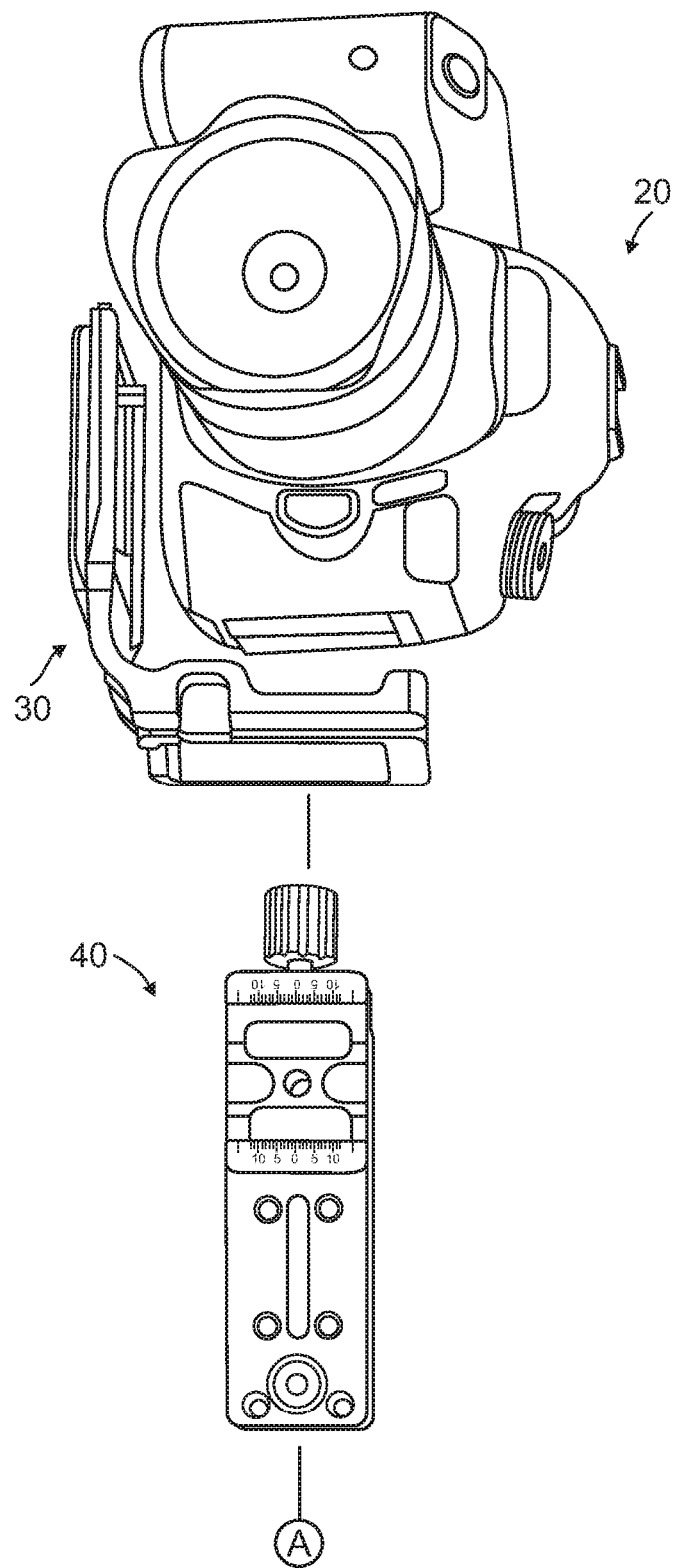
FIG. 2A is a partial exploded view of the components of the single camera stereo panoramic rig identified in FIG. 1.
Figure 2B:
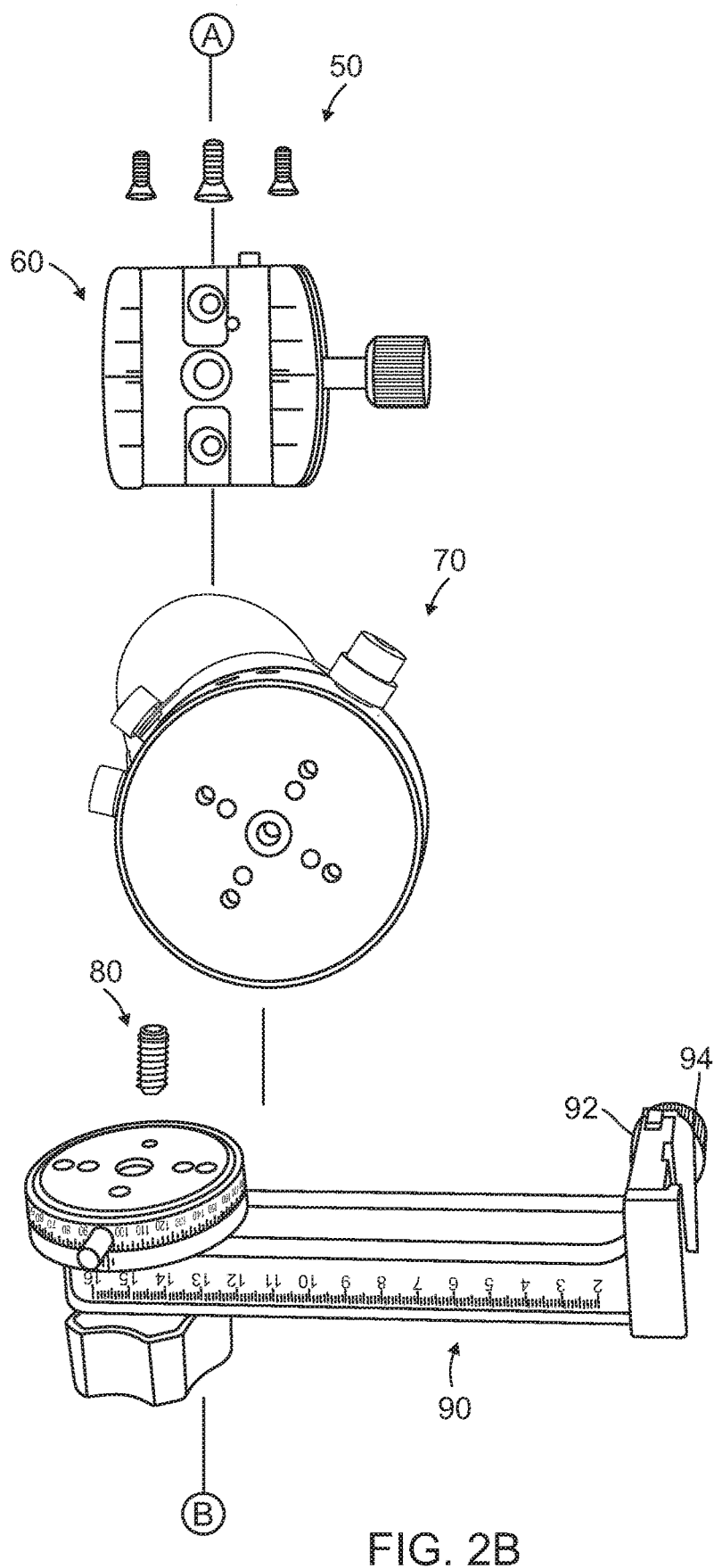
FIG. 2B is a continuing partial exploded view of remaining portions of the single camera stereo panoramic rig illustrated in FIG. 1.
Figure 2C:
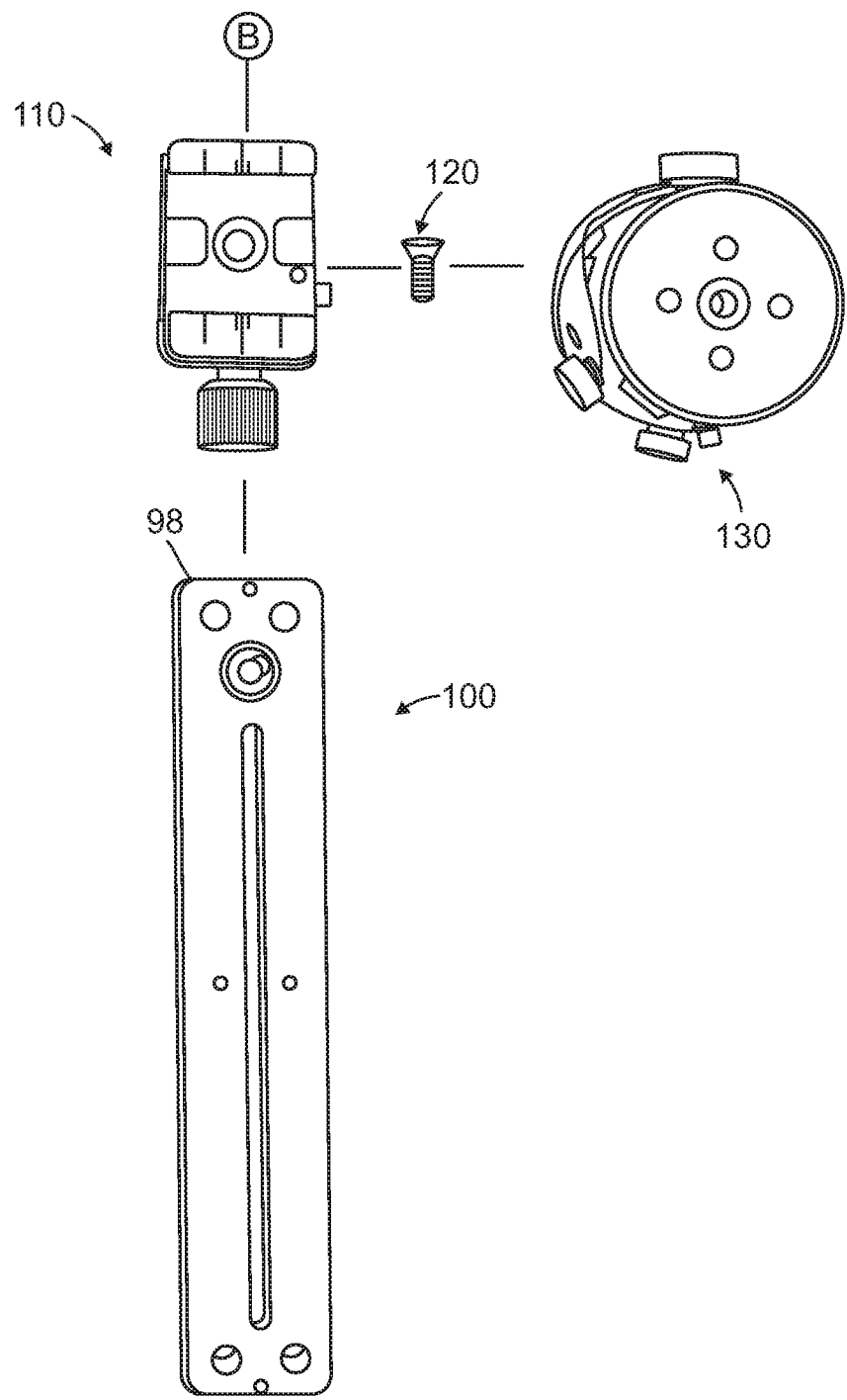
FIG. 2C is a broken away view of the Arca-swiss compatible plate with 90 degree clamp allowing camera to slide left and right depicted as part of FIG. 1.

Referring to FIG. 1 and to FIG. 2A, FIG. 2B and FIG. 2C, there is illustrated both in the assembled condition and in the exploded component condition, the assembled view of the single camera stereo panoramic rig 10. The components include a 35 mm. single lens reflex (SLR) camera 20 (for example, Canon 5d Mark 3). Camera 20 includes a full frame sensor. The camera preferably also has 20 mega pixels or higher with an auto exposure bracket feature. It will be appreciated that the present invention incorporates two duplicate single lens reflex cameras for use as will be described.

The present invention stereo panoramic rig includes a custom fit "Arca-Swiss" compatible L-shaped camera mount bracket 30. The custom fit keeps the camera from twisting on the head.

Further referring to FIG. 1 and FIG. 2A, there is illustrated the "Arca-Swiss" compatible plate with 90 degree clamp 40, allowing for the camera to slide left and right. Also illustrated are hex screws 50 (see FIG. 2B) for mounting the "Arca-Swiss" compatible clamp to the rotator base (see FIG. 2A). The equipment further includes an "Arca-Swiss" compatible clamp 60 (see FIG. 2A).

Referring to FIG. 1 and FIG. 2B, the equipment for the single camera stereo panoramic rig further comprises a large rotating panoramic base with adjustable degree increments 70. The rig also includes a threaded hex screw 80 for attaching the panoramic base 70 to the horizontal arm 90. The horizontal arm 90 includes a distal end 92 where a vertical "Arca-Swiss" compatible end clamp 94 is affixed to allow vertical arm attachments.

At the distal end 92 of the horizontal arm 90 and attached through the "Arca-Swiss" compatible end clamp 94 is a proximal end 96 of a vertical "Arca-Swiss" compatible plate 100. Affixed at the distal end 98 of the vertical "Arca-Swiss" compatible plate 100 is an "Arca-Swiss" compatible clamp 110. As part of the attachment mechanism there is included a hex screw 120 for mounting the "Arca-Swiss" compatible clamp to a small rotating panoramic base with adjustable degree increments 130.

Figure 2D:
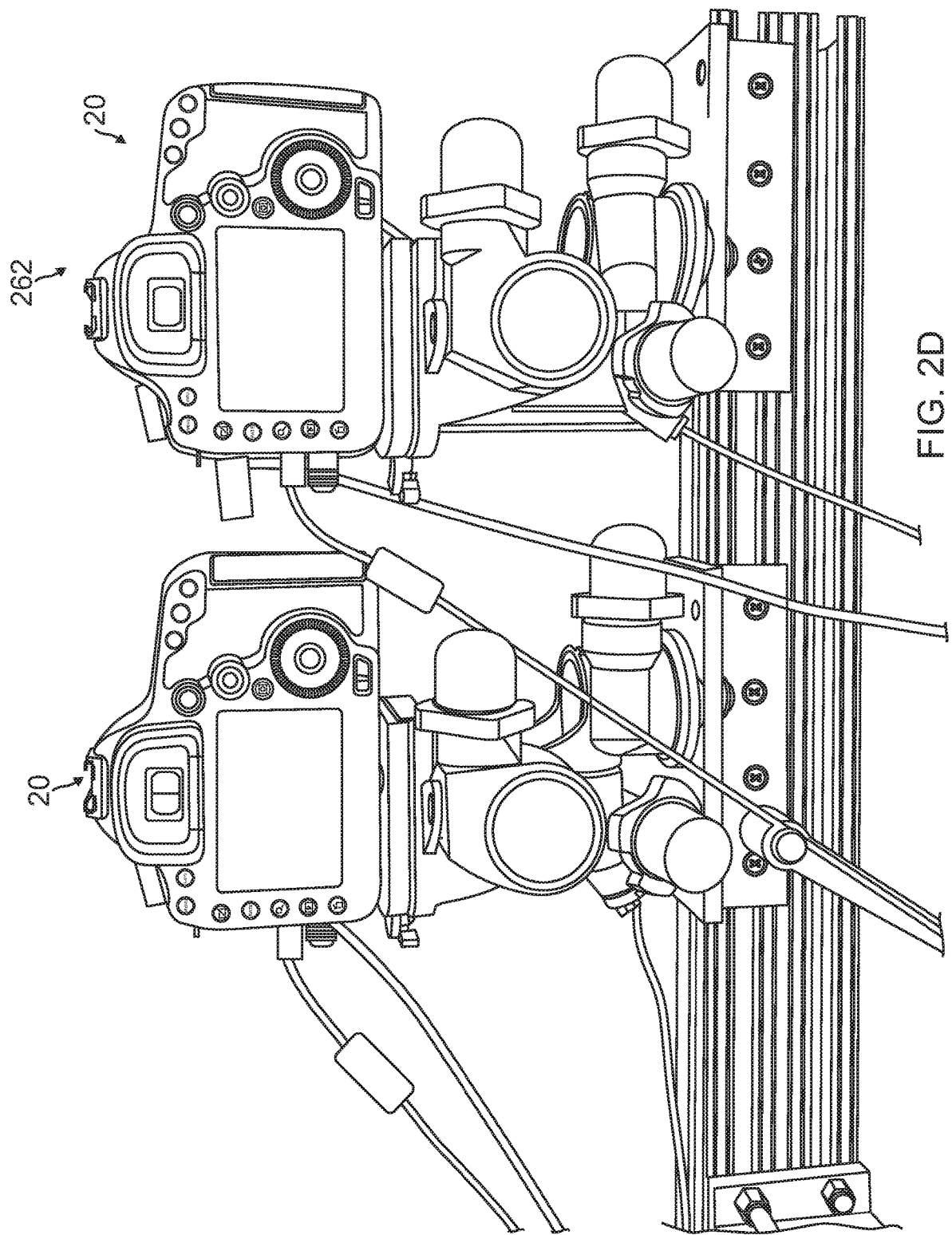
FIG. 2D is a rear view of two cameras shown side by side to shoot images as depicted in FIG. 3.
Figure 3:
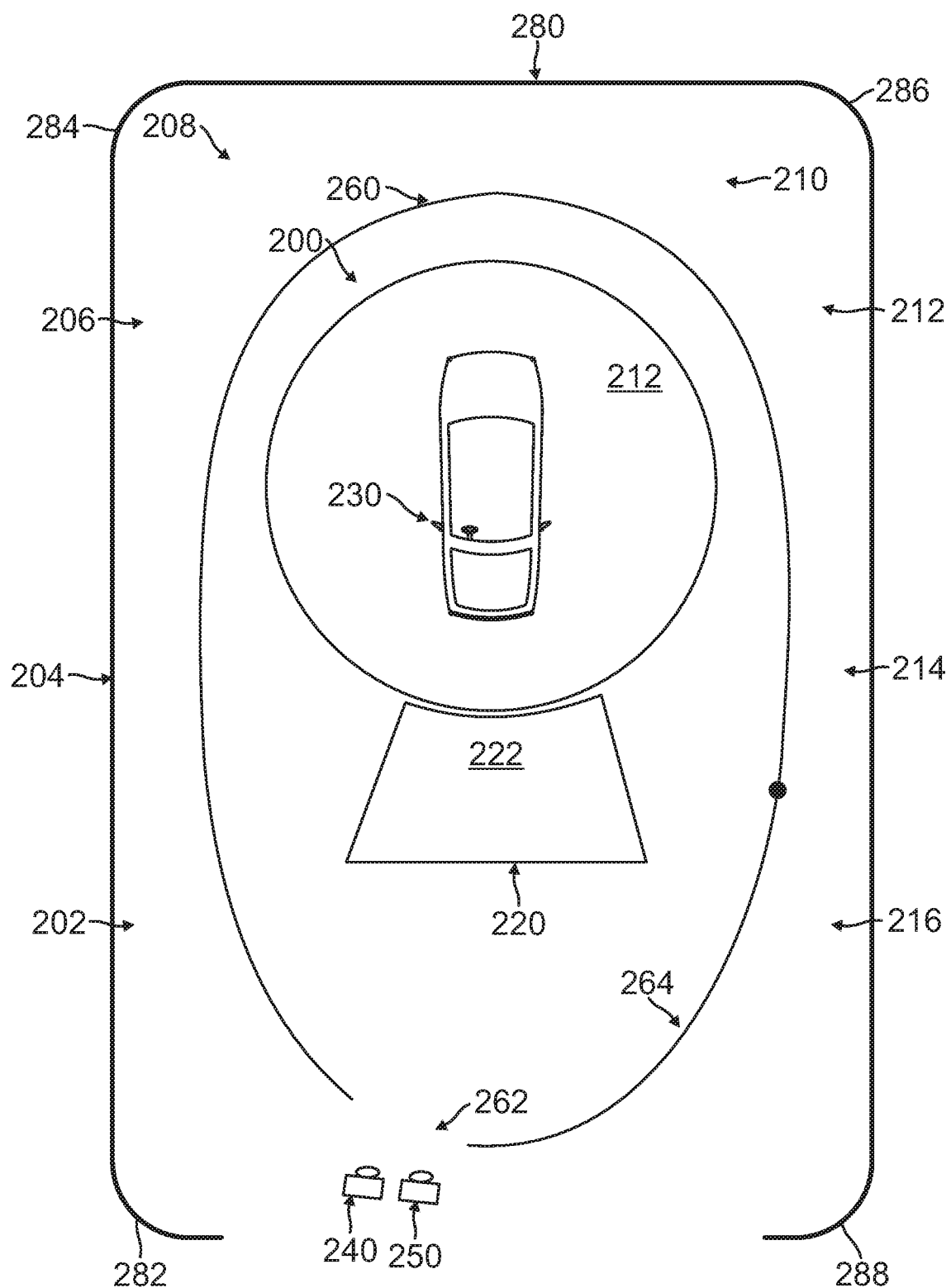
FIG. 3 is a top plan view of the stereo spin stage overhead diagram.

Referring to FIG. 2D, there is shown two cameras 20 side by side to shoot left eye images and right eye images through horizon wall hole 262 (also shown in FIG. 3).

In addition to the above specific apparatus, the present invention also utilizes the following additional equipment for performing the novel method to be hereinafter described:

a. A shutter release cable with extension to enable remote releasing of the camera.

b. (6-8) 1,000 Watt Fresnel lights and (2-4) 2,000 Watt or comparable lighting kit utilizing these lights.

c. Diffusion and/or minus green gels.

d. A computer with Adobe Bridge, Photoshop, PTGui software, EOS Canon capture software, and Unity or other comparable software.

e. Stage including: stage wall, grey horizon wall, turntable, and ramp.

II. Initial Steps to Create the Appropriate Lighting and Corresponding Setup for Appropriate Photography for Use in the Present Invention The following detailed description is written in narrative form in order to better explain how the present invention is implemented and to explain all the detail components in a manner that is understandable to a reader.

Referring to FIG. 3, Stage wall 280 is a generally rectangular wall with curved corners: lower left corner 282, upper left corner 284, upper right corner 286, and lower right corner 288. Enclosed within stage wall 280 is an elliptical shaped grey artificial horizon wall 260 that surrounds the stage and is almost entirely enclosed except for horizon wall hole 262 that allows left camera 240 and right camera 250 to unobstructedly shoot the car 230 as it rotates on turntable 200. Horizon wall 260 also has a hingably connected portion of the wall 264 that opens and closes to allow a car to enter and exit the stage area.

In between stage wall 280 and horizon wall 260 there are eight (8) spaced apart stage lights positioned around a portion of the area. Using the same coordinate system that will be used for the discussion of the turntable is defined to be left is equal to 0 degrees and 360 degrees, up is equal to 90 degrees, right is equal to 180 degrees, and down is equal to 270 degrees. Moving clockwise away from left camera 240 and around turntable 200, place the lights around horizon wall 260 at approximate locations and approximate positions:

1. First stage light 202 with 1 kilowatt of power at approximate location 315 degrees and lamp positioned to illuminate stage wall (280) at 45 degrees.

2. Second stage light 204 with 2 kilowatts of power at approximate location 360 degrees and lamp positioned to illuminate horizon wall (260) at 225 degrees.

3. Third stage light 206 with 1 kilowatt of power at approximate location 45 degrees and lamp positioned to illuminate stage wall (280) at 315 degrees.

4. Fourth stage light 208 with 1 kilowatt of power at approximate location 60 degrees and lamp positioned to illuminate stage wall (280) at 315 degrees.

5. Fifth stage light 210 with 1 kilowatt of power at approximate location 130 degrees and lamp positioned to illuminate stage wall (280) at 210 degrees.

6. Sixth stage light 212 with 1 kilowatt of power at approximate location 150 degrees and lamp positioned to illuminate stage wall (280) at 220 degrees.

7. Seventh stage light 214 with 2 kilowatts of power at approximate location 180 degrees and lamp positioned to illuminate horizon wall (280) at 300 degrees.

8. Eighth stage light 216 with 1 kilowatt of power at approximate location 200 degrees and lamp positioned to illuminate stage wall (280) at 135 degrees.

II. Positioning of Vehicle on Turntable

It has been discovered that the appropriate number of images for a vehicle is typically 72 images. There are 36 images taken from the left eye view and 36 images taken from the right eye view.

Referring to FIG. 3, vehicle positioning prior to shooting images perform the following steps:

1. Set the turntable (200) to 83 degrees whenever you prepare to drive a new car 230 up onto the stage I turntable 200.

2. Place cardboard mats down on turntable 200 and ramp 220 so as to prevent tire marks on the turntable surface 212 and ramp surface 222.

3. Center car 230 by driving on turntable 200 using a laser guided system that is already in place.

4. The laser should end up splitting the vehicle through the back center of the car (usually the logo) and a spot determined to be the center of the front dashboard, rear-view mirror, or overhead control pane] of car 230.

5. Once car 230 is lined up on turntable 200 with laser guided system, put the car in park and engage the parking brake. Proceed to shut the laser off and turn the stage lights back on.

6. At the Kuper spin computer station go to the eVox Axis Control screen. Rotate turntable (200) to O degrees.

7. On both right and left spin computers open the "Spin" folder on the Desktop and create a new duplicate folder.

8. In the Canon software open the save settings screen section. Open and choose folder section and select [click choose] the folder you just created on the desktop. Rename the file accordingly and reset counter to 1. Do this for both right and left cameras.

9. When the car has finished moving it should be at profile on the camera. Shoot one frame using the raw image format on the centered camera (right side).

10. In Photoshop open the file you just shot and flip the image (F6) horizontally. The car should be an exact image of the background layer with no ghosting. Use guides to check this, there should be no more than a five pixel difference when the image is at 200%.

Block the Car

11. Once you get the profile set, it is time to place the wheel blocks under the front and rear tires in order to stop the car from rolling. Then get in the car and put it in Neutral and release the parking brake. Elevate the car with a jack from behind the turntable and jack up each wheel, jacking from the suspension arms. Turn each wheel until the valve stems are centered at the bottom.

12. Once all four wheels are centered, put the jack away and put the car back into Park and re-engage the parking brake. Then remove the wheel blocks.

13. Now that the table is again at O degrees, take another photo and check for ghosting on the profile again, as jacking the car may have thrown the profile off. Drive the car either forward or backward if need be, in order to fix any ghosting.

Vehicle Centering

14. Now that the car is perfectly centered with wheels centered as well, you may close the stage up using the dividers and rolling curtain. At this time, double check the car to make sure all windows are rolled up, the wheel blocks are off, the black license plate on the front and back of the car are in place and straight, and that no stickers are left on the car. Make sure no bulbs are burnt out. Also, make sure that there is no light leaking in from outside the stage onto the car. Then, make sure the numbering chart in front of the table is set to the correct number. If the car was leaking exhaust onto the table while aligning it, now is the time to use the mop stored at the rear of the table to mop up any puddles or moisture from the table.

Overhead

Before you start the spin, you must take an overhead shot of the car following these steps:

1) Place a grey card on the table floor on the driver side facing upward

2) Turn off the overhead light switches found on the computer station side of the stage and make sure no lights are flaring in the overhead camera 3) Go back to the computer and open the EOS Utility program 4) Release the shutter from the EOS Utility control panel 5) Preview of the image captured and save it to the server in the correct vif folder→Exterior Stills→Edited folder under the correct vif name. Turn the overhead lights back on and remove the grey card from the table floor.

Again, double check the car and make sure everything looks okay. Now begin the spin. Spin Vehicle and shoot photo images.

Go to the EOS Utility program and reset the file numbering back to 1. Then double-check that the images will be sent to the correct folder destination. Do this for both right and left cameras.

Remove any images accumulated in the destination folder(s) during the setup so the folder is empty. Place the car key on the workstation counter during the spin to prevent lights on the car from flashing during the spin.

1. At the Kuper based computer station go to the e Vox Axis Control screen and make sure the table is set to O degrees.

2. Monitor the spin from the computer and by cursory inspection to ensure that the turntable moves five (5) degrees for each frame.

3. Once the spin has completed, upload the spin images to the server under the correct car file number in its specified spin folder. There should be 72 frames from each spin camera and 144 total per vehicle.

a) Exterior spins should be delivered in a set of 36 frames that start in the left position at Image "1 0".

b) Numbering should proceed in increments of 10 all the way up to 360 to allow for the full spin.

c) Both Left and Right images should be delivered in the same directory.

d) File naming format should be:
{IMAGE_PREFIX}_{left/right}_{index}.png
Example: CGL0000_BK_EXT_left_01 O.png e) Folder naming convention should be:
{IMAGE_PREFIX}_{Resolution}/
Example: CGL000_BK_1024/ f) Images should be delivered in a transparent .PNG format. (No Compression)

g) Requested image delivery resolutions are evolving, but currently 1024, 1280, and 2048 images are best.

h) Framing is very important, the most important thing is that all the cars that will appear in the same build are delivered at the same size relative to each other.

i) Each delivery should include a 128px (full frame) version of the "Left 240" image. This image should be called "Thumb.png" and placed in the root folder for that color.

j) The file prefix should not change delivery-to-delivery. Whichever prefix convention is used it should be locked and not change.

Resource

1. Open the "vif_spin☐ost" folder on the desktop.
Before spin is initiated, check the following folders for old files:
00_source, 01_composite, 02_shadow and 03_crop and make sure these folders are empty.

These folders should be empty of any previous project files.

2. Then connect to the VIF server "vif xserve11 Network Drive.
In the server, go to:
Ol_active>AILOxxxx (Project Name)>spin>Ol_spso
There should be 36.tif files in this folder.

3. Copy all 36.tif files into folder: vif_spin_post>Ol_composite" located on your desktop.

4. Then, close the "vif_xserve>" folder.

Renaming Files

1. Select all 36.tiffiles in the "vif_spin_post>Ol_composite" folder Right click and select the renaming utility "A Better Finder Rename".

2. In the Rename Utility screen, scroll through the "Action:" drop down menu. Select "Produce numbered list".

Parameters:
Set the "Prefix:" to the current project number "AILOxxxx_spco_" and the "Suffix:" to 11.tif".
Set the "Start With:" to "1", "Step Value:" to "1", and "Padding:" to "3".
Check the "Show full preview" box on to view the old name and the new name.

The new name preview is to the right. It should look like this: "AILOxxxx_spco_001. tif"

3. Select "OK"

4. Select "Rename All"

The 36 frames are now ready for masking.

Alpha 1 Masking

1. Beginning with frame "AILOxxxx_spco_001. tif", begin masking your vehicle very tight using the pen tool.

2. Mask Trouble Spots:

Antennas: make sure to mask them carefully

Car Undercarriage:

Be sure if smoothing sharp edges or shaving some of the undercarriage off in the mask, that you are consistent in all the frames.

It is not necessary to include every small detail, just be consistent with every frame in what you mask.

Car Tires:

Be sure to mask areas that show through the spokes, also mask the ridges in the tread.

Pay close attention to the shape of the tires as well, as most tires are slightly irregular. Be sure that tire curves look smooth and rounded and to make the mask as tight as possible.

3. When complete, double select the work path layer and name it Path 1.

4. Feather your selection by 0.5 and convert your selection into an Alpha Channel.

5. By default name it "Alpha 1".

After you have created your Alpha Channel.

6. Save and close the file and move on to the next frame. Complete this process for all 36 frames.

Alpha 5 Masking (after finishing creating Alpha I Masking)

1. For all 36 spin frames mask out the windows and make an Alpha channel named Alpha 5.

Mask only the clear see through areas that show through the windows, not the parts that contain seats and other non transparent elements 2. Then, double select the work path layer and name it Path 5.

3. Make your Path 5 a selection.

4. Feather your selection by 0.5, and convert your selection into an Alpha Channel.

5. By default name it "Alpha 5". After you have created your Alpha Channel.

6. Save and close the file and move on to the next frame. Complete this process for all 36 frames.

Creating a Shadow

1. Open Frame 1. In the actions palette, go to "vif_spin_post.atn">ref_turntable_selection".

2. Select the drop down menu arrow and throw away the "Set Selection" action in it.

3. Select the action "ref turntable selection" and select the "Record" button at the bottom of actions palette.

4. Using the polygonal lasso tool, make a "rough" selection of the inside part of the turntable.

The selection should be fairly close to the inside edge of the turntable and does not need to be exact.It should not touch the edges or come close to the shadow of the vehicle.

5. When you have selected the turntable, select the "Stop" button in the actions palette.

6. Close the file.

Adjusting a Shadow

1. Open frame 8.

2. In the actions palette, go to "vif_spin_post.atn>shadow"

Select the drop-down arrow. Double select on "Duplicate Red Channellien select "OK".

3. Zoom the frame to 33.33%. This will make adjusting your curve easier. Underneath the same action, scroll down some and double select on "Curves". the curve should be adjusted so the shadow beneath the car is well formed+ and distinct (which usually doesn't require a whole lot of adjusting).

Tips on Adjusting Shadow Curve

The curve should have three points of articulation that appear as tiny squares.

Select and adjust the top square to the left and right only. This will change the width of the shadow.

The very edge of the shadow should appear to extend slightly past the outside edge of the tires.

Select and adjust the middle square vertically and/or horizontally. This will change the "density" of the shadow.

You can adjust the shadow to look very dark or very light with this adjustment.

Adjust this point of the curve to make the shadows darkest areas about 80-90% of pure black.

The bottom point should be exactly in the bottom left hand corner of the graph at all times.

Your shadow should have a smooth gradient on the outer edges from it's darker areas to the lighter outside areas.

4. Select OK. Close your file and Don't Save.

5. Open frame 1 and frame 8 in composite folder.

6. Select a frame (it doesn't matter which one you test first), go to your actions palette and select the "shadow" action and press play. Do the same to the other frame. The action will save out a copy in the shadow folder.

7. Go to your

"vif_spin_post>02_shadow"

located on your desktop. There will be two files in this folder. Open both frames and run action "man shadow fix start" on both files.

If shadows looks bad and spotty repeat Step 4: Adjusting Shadow. If the shadow looks good, continue.

8. Delete both frames in the 02 shadow folder.

9. Go to

File>Automate>Batch

Follow the settings:

Play: Set the "Set:" to "vif_spin_post.atn"

Set the "Action:" to "shadow"

Source: Folder

"Choose" your folder "vif_spin_post>01_composite"

Destination: None

Select OK.

Batching will begin.

Posting a Shadow

1. When batching is complete, go to

"vif_spin post_>02_shadow"

Open the first frame.

There will be 36 frames in this folder.

2. To fix each shadow open each frame individually and Run the "man_shadow_fix_start", the "lever" layer will be selected by the action.

3. Select the paintbrush (100 soft brush preferred) with white as the foreground color and begin painting out irregularities of the cars' shadow.

4. When finished with the "levels" layer", continue the process on the "shadow fix" layer. Select the "shadow fix" layer and begin painting out irregularities of the car's shadow on the "shadow fix" layer.

Paint primarily around the undercarriage of the car and at the pinch points of the tires.

Be careful to do as little as possible to the main shadow itself to avoid continuity problems in other frames.

If possible, try to avoid posting the front (frame 1) or rear end (frame 36) of the shadow.

5. Then run "man shadow-fix-finish". This will close and save your file in the same folder.

6. Complete this process for all 36 frames.

This will complete the shadow process.

Creating a Crop

1. Open frame one and Run the "ref_prep_crop" action. This will create an outline filled with black around the car.

2. Zoom in to 100% and drag the two guidelines, one exactly to the front end of the black outline of the car, the other one to the back end of the black outline of the car.

3. Zoom out to 16.67% or to your preference.

In the "ref_crop" action, under the "stop" action, double select on the "crop" action.

This puts the action into record mode.

4. Move the existing crop to the center of the car and line up the outside edges exactly with the guidelines.

(There should be an equal amount of white space at the top and bottom of the car outline)

Press enter.

Check that the car is centered, use the marquee tool to create a box from the top edge of the frame to the top edge of the car outline, then drag that box to the bottom edge of the frame.

The top edge of the marquee box should be at or very near the bottom edge of the car outline if the crop is centered correctly.

If you need to adjust the crop, simply go to your history palette and go back one step (command z), this will put you back where you set the guidelines and double select on the "crop" action again.

5. Exit the file and Don't Save.

The files are ready to be cropped.

6. Go to Photoshop

"File Menu>Automate>Batch"

Play:

Set the "Set:" to "vif_spin_post.atn"

Set the "Action:" to "crop"

Source: Folder

"Choose" your folder "vif_spin_post>03_shadow"

Destination: None

7. Select Ok.

This will save a crop copy of all 36 frames into the "vif_spin_post>04_crop" folder Final Inspection Camera reflection:

1. Open frames 1, 10, 19, and 28 in the "vif_spin_post>04_crop" folder located on your desktop.

Check to see if the camera reflection is visible. If so, use the clone stamp tool to remove reflection.

Blown out areas:

2. Open frames 9, 11, 27, and 29.

3. Check for blown out areas. If blown out areas found do the following:

Use the "alpha 1" mask to make a selection of the car.

Select the paint brush and set mode to "Darken" and the painting opacity to 15%.

Use quick strokes over the blown out areas to paint in a little detail.

Adding Adjustment Layers

1. Go to

"vif_xserve:0 1_active:AILXXXXX:AILXXXXX_spin:AILXXXXX_00_spre:"

Download the xxxx,acv and xxxxx.ahu to you spin resources folder

"Macintosh HD:Users:xxxxxx:Desktop:vif_spin_post: 00_resources:"

2. Once it is on the computer apply the adjustment layers to images

3. Select the alpha 1 then go to layers/new adjustment layers/curves, the curves window should pop up.

4. Then select load, locate for xxxx.acv and press ok to load the adjustment curves on to the image, do the same for huesat layer.

Output (This process creates the frame outputs)

1. Go to

"File>Automate>Batch 11

Set to+

"vif spin_output" and the action to "output"

This will give you jpg, pct, and png files.

2. Then upload files to the correct folder.

--- vif -xserve:01 -active: final deliverables:AIL0xxxx:exterior -036 -spinframes - -1280 vif_xserve:01_active:_final_deliverables:AIL0xxxx:exterior_036_spinframes_0640_png This will output your composites into 15 different file formats:

exterior_ 001 _ spinframes _ 0080 exterior_036jpg_320 exterior_ 036 jpg_ 480 exterior_ 03 6 jpg_ 640 exterior_ 036_pct_320 exterior_ 036 _pct_ 480 exterior_ 03 6 _ spinframes _ 0640 _png exterior_ 036 _ spinframes _ 1280 exterior_ 036 _ spinframes _ 1280nc exterior_ 03 6 _ spinframes _ 1280nc _png exterior_ 036 _ spinframes _ 2400nc exterior_ 036 _ spinframes _ 2400nc _png spin_ 0640x0426 jpg spin_0640x0426_png The following disclosure is by example for the exterior panoramic view. This same technique can be used for interior panoramas as well.

Figure 4:
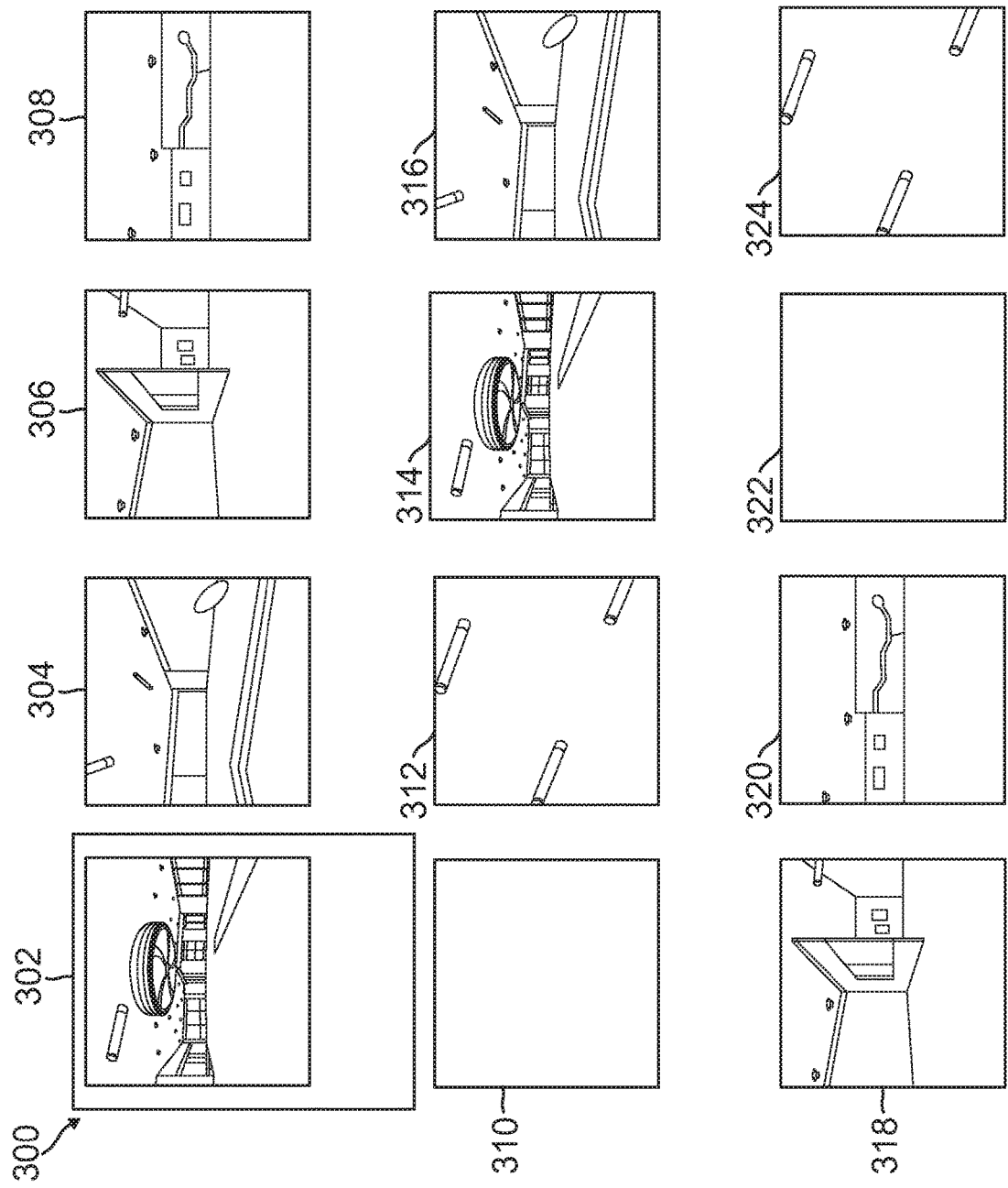
FIG. 4 is a schematic view of all the cube faces (6 left and 6 right) that form the left cube and the right cube.

Referring to FIG. 4, the images themselves will be placed into a 360 degree pre-rendered Computer Graphic (CG) virtual environment. The images are created in an Equal rectangular format, then output as six cube faces for presentation in Virtual Realty.

This virtual environment is created by combining 6 cube faces as shown in FIG. 4. The textures are output with the following number indexing:

0=FRONT
1=RIGHT
2=BACK
3=LEFT
4=TOP
5=BOTTOM

Figure 5:
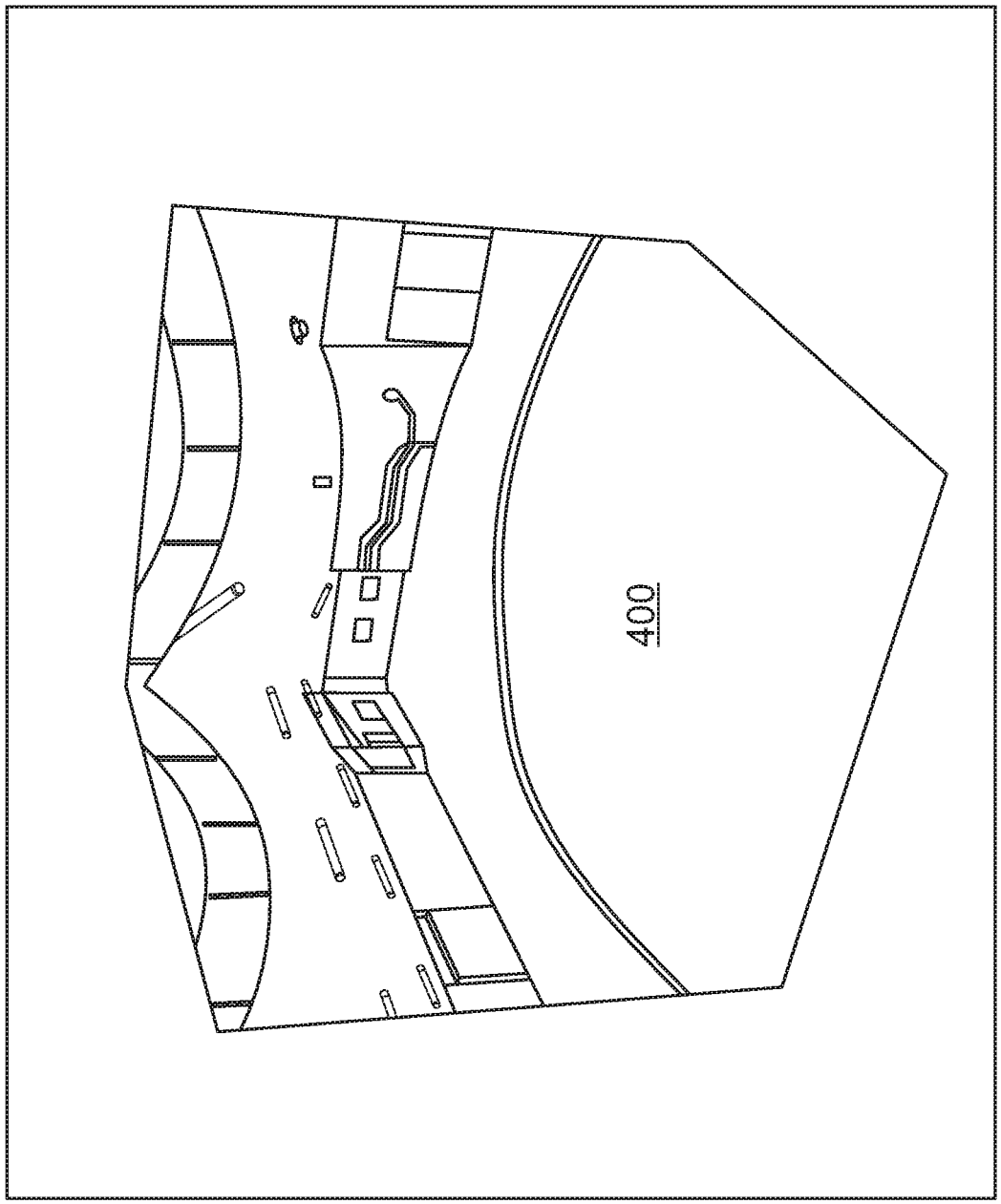
FIG. 5 is a front view of either the left or right cube which forms the virtual environment or virtual showroom where the cars are viewed.

Stereo images are differentiated by a set of left eye images and a set of right eye images. The Left eye images from FIG. 4 are (left front face 302, left right face 304, left back face 306, left left face 308, left top, face 310, and left bottom face 312. The eye images from FIG. 4 are (right front face 314, right right face 316, right back face 318, right left face 320, right top face 322, and right bottom face 324). These images are then formed into a cube and skybox 400 (shown in FIG. 5) to create the background environment for car 230 to be viewed. Skybox 400 is created from two inverted cubes to create the virtual showroom environment that the external panoramic images (filenames exterior spinframes) can be placed into to form a shutterbox (shown in FIG. 9).

Figure 6:
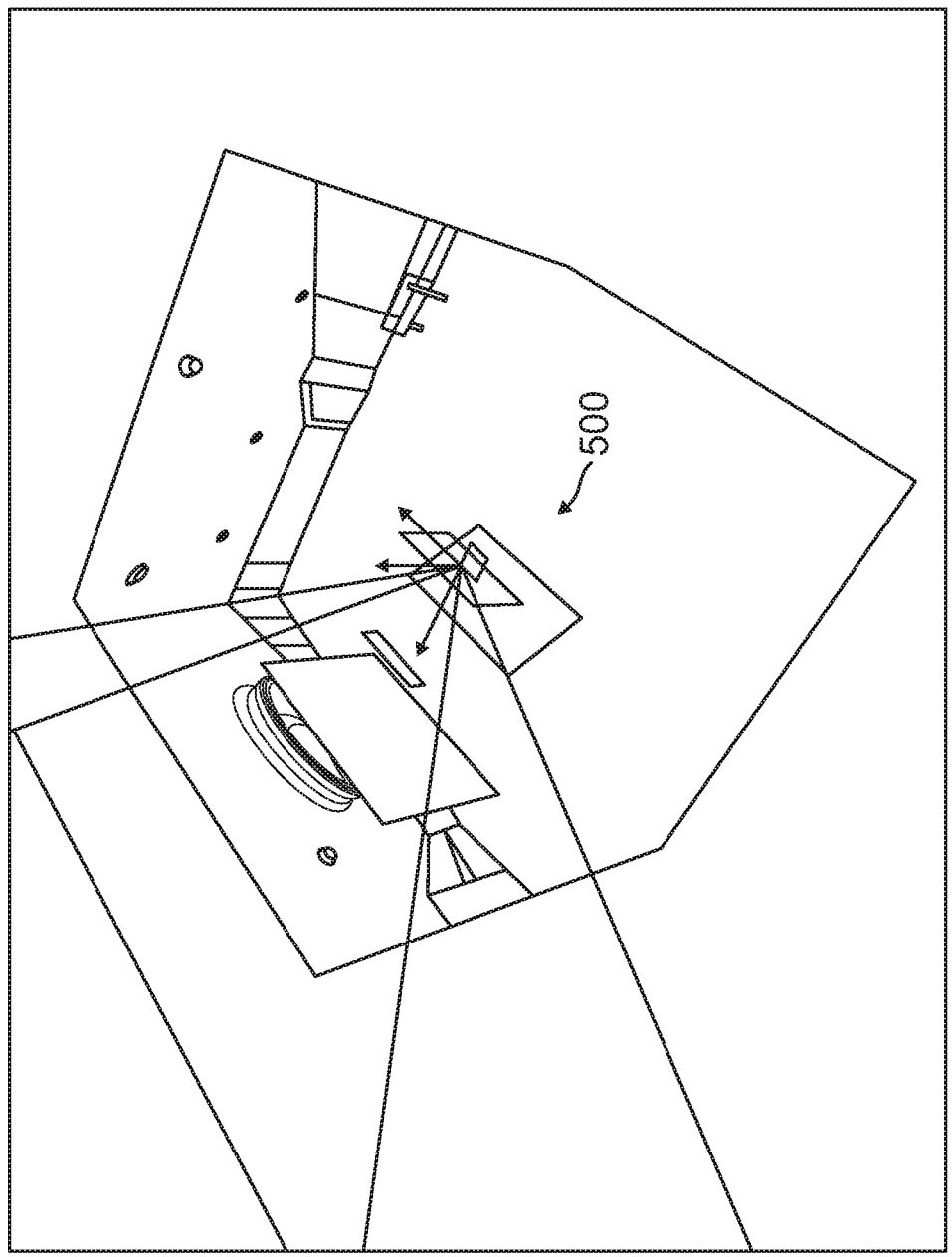
FIG. 6 is a schematic of the virtual camera illustrating that the virtual camera is positioned to aim at the center of the cube.

Once the textures are correctly setup on the cube object, a Virtual Realty (VR) Camera object 500 (as shown in FIG. 6) is placed in the center of the cube. It is important that the VR camera is placed at a fixed point directly in the center of the cube.

Further referring to FIG. 6, the camera object 500 is a left eye camera and a right eye camera parented to a "neck" control rig, with the following setup:

Both cameras are parented to the parent "neck" control rig object. The Left Eye camera has the following unique settings:

Local Position to the parent is (0, −0.03, 0)
Layermask excludes the "Right" layer.
The Right Eye camera has the following unique settings:
Local Position to the parent is (0, 0.03, 0)
Layermask excludes the "Left" layer.

Figure 7:
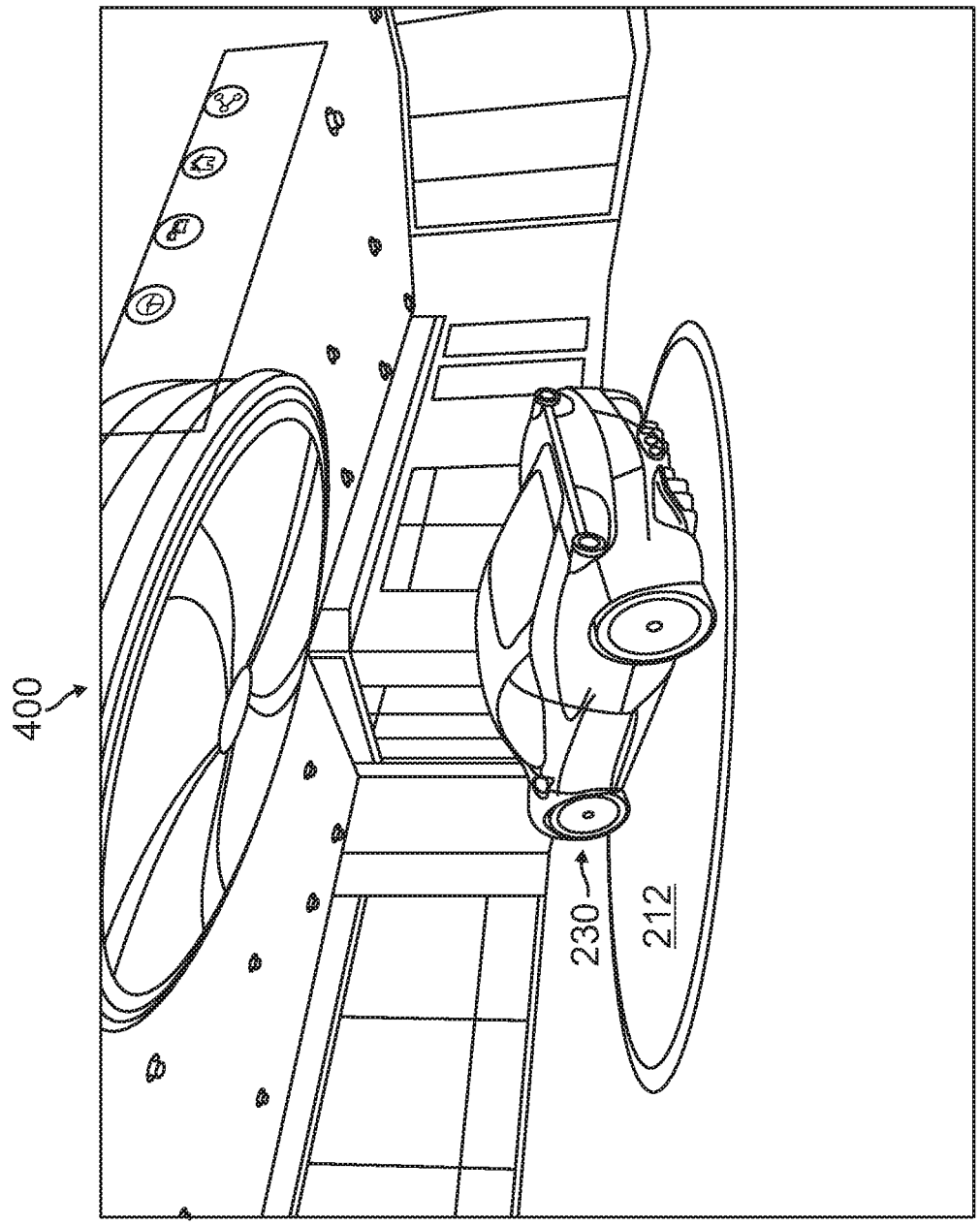
FIG. 7 is a front view of the cube/virtual environment with an external panoramic image overlayed/layered.

Referring to FIG. 7, the Car spin panoramic images are placed onto the skybox 400 by having the car spin panoramic images line up with the front face of skybox 400. This ensures the images has the perfect amount of distortion and is scaled precisely on import.

Figure 9:
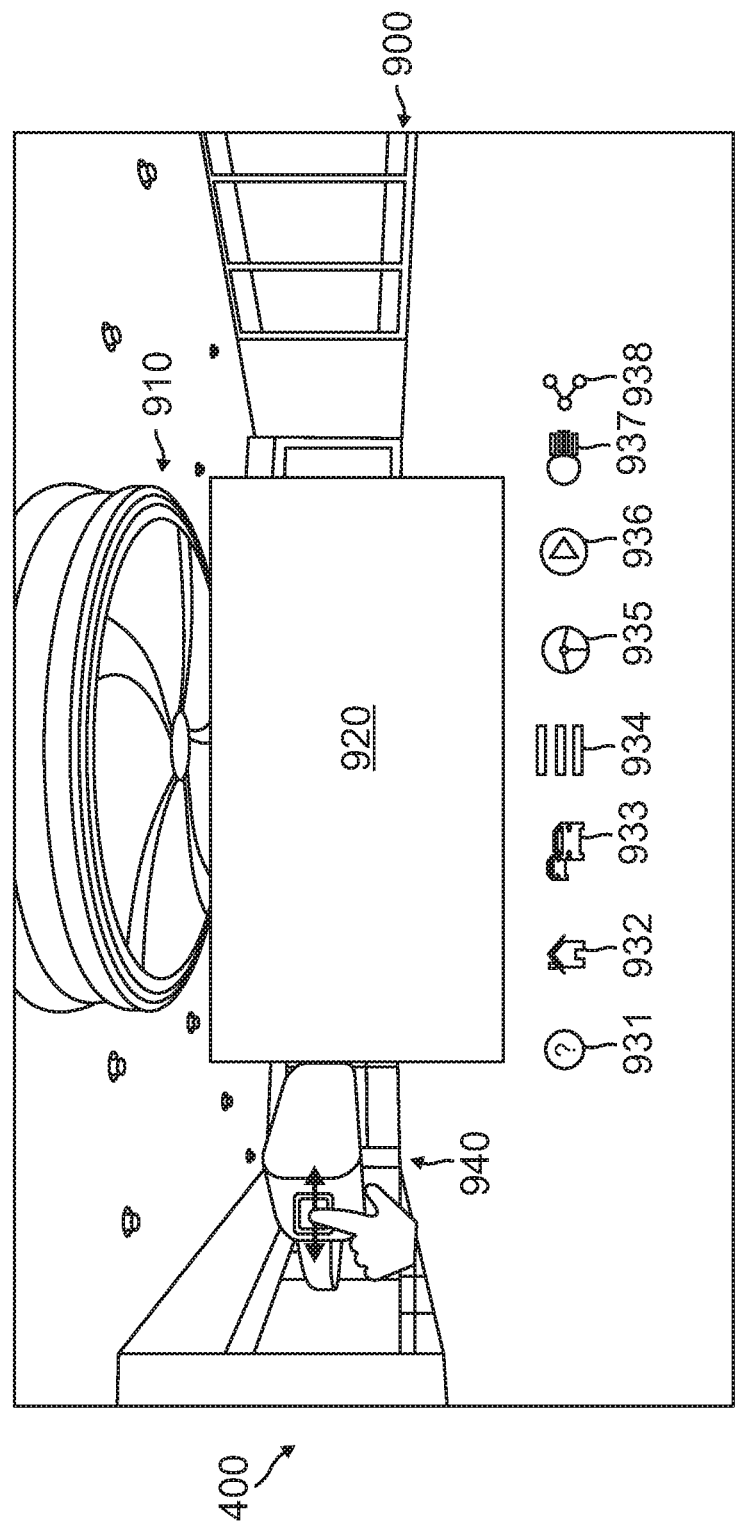
FIG. 9 is an illustration of a shutterbox that includes the cube/background environment, multiple graphic user elements, and a central area that has been colored white to illustrate that different cars can be selected and imported to this area.

Referring to FIGS. 7 and 9, once the car is lined up, a special Shutterbox script is synced to an invisible rotating "anchor" object that determines the current rotation of the car. Depending on the number of images available for the spin, the Shutterbox script seamlessly switches out the appropriate left and right images depending on what angle the anchor object is currently rotated to.

Figure 8:
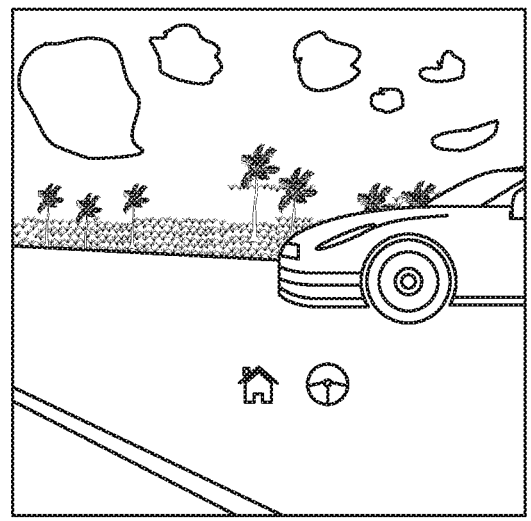
FIG. 8 is an illustration of the graphic user interface element of a steering wheel with a shadow effect to appear as if from the same lighting source but created as a separate layer to seamlessly integrate and layer over a panoramic image.
Figure 8:
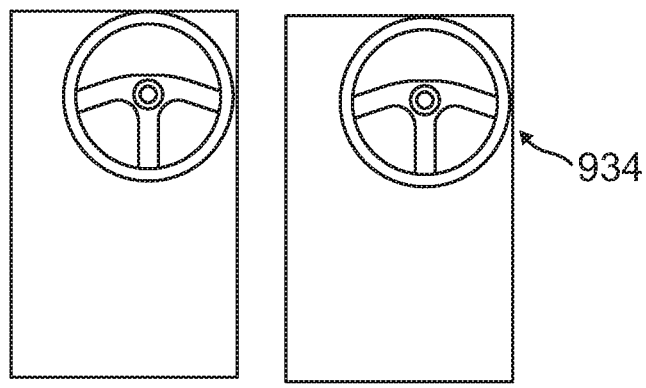

Referring to FIG. 8, beginning with either a stereoscopic panoramic interior photo of a car or a stereoscopic panoramic exterior photo of a car, selectable graphic user interface object will be superimposed as a layer on top of the panoramic car images.

Referring to FIG. 8, and by way of example, superimposed Graphic User interface (GUI) allows the user of the head mounted display to select the elements/objects (element and object will be used interchangeably). In FIG. 8, Graphic user interface steering wheel 934 can be selected by the user to switch the user from viewing the panoramas for the outside of the car to viewing the panoramas for the inside of the car.

Insertion of Graphic User Interface

Referring to FIG. 9, there is illustrated a shutterbox 900 which consists of the virtual showroom skybox 400, multiple graphic user interface objects (931, 932, 933, 934, 935, 936, 937, 938, and 940), car 230 (not shown), and a white box 920. White box 920 represents a car that can be selected by the user from third graphic user interface object 933. Third graphic user interface object 933 is just one of the 3D objects that have been layered into shutterbox 900 to allow a user to interact with virtual showroom skybox 400. Each graphic user interface selection object (first graphic user interface 931, second graphic user interface 932, third graphic user interface object 933, fourth graphic user interface object 934, fifth graphic user interface object 935, sixth graphic user interface object 936, seventh graphic user interface object 937, and eighth graphic user interface object 938) shown in FIG. 9 is an individually produced and layered graphic object. These Graphic User interface (GUI) objects can be but are not limited to photos, videos, text files, or user accessible libraries such as the car library.

In order for the user to be able to access each of the individual icons/graphic user interface elements, the user uses a mouse in the center of the image and by rotating the user's head down, left or right, the user can select the desired graphic user element as discussed below. Therefore, the movement of a persons head while weaning HMD functions as a mouse to point to the specific icons.

In FIG. 9, by example, first graphic user interface object 931 is an information or help file for the user. Second graphic user interface object 932 takes the user back to the initial page or home page. Third graphic user interface object 933 allows a user to select a different car to fit within white box 920. Fourth graphic user interface object 934 is an interface that allows the other objects to be viewed when selected. Fifth graphic user interface object 935 changes the view to the inside of the car. Sixth graphic user interface object 936 is a video. Seventh graphic user interface object 937 allows the user to view the headlights, and eighth graphic user interface object 938 allows the user to connect with social media. The order and number of the selection objects is not limited to what is shown in FIG. 9. It is within the spirit and scope of this invention to have different configurations oflayered selection objects within shutterbox 900.

Figure 10:
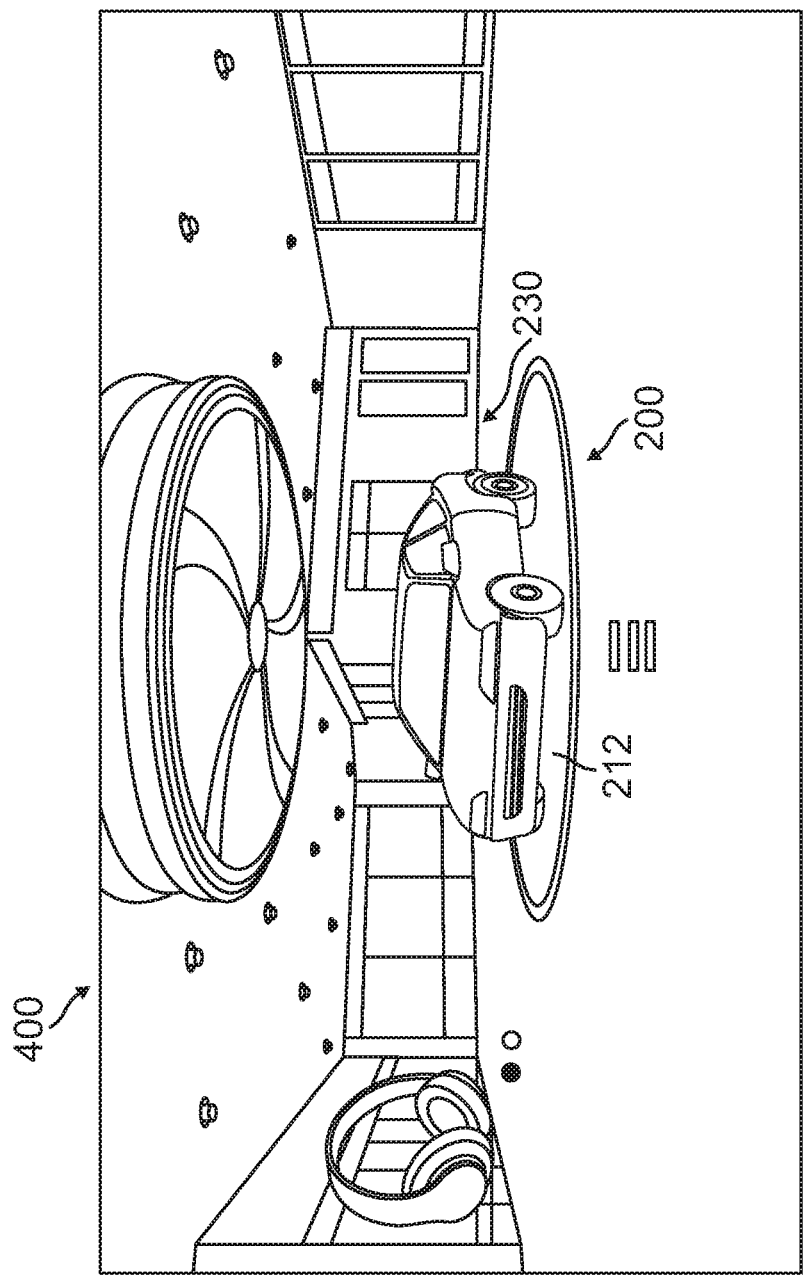
FIG. 10 is an illustration of a shutterbox that includes the cube/background environment, multiple graphic user elements, and a selected car positioned on a turntable.

Also shown in FIG. 9, is spin graphic user interface object 940. This object allows a user to rotate the currently viewed car 230 to any desired rotation angle. Referring to FIG. 10, when car 230 is selected within virtual showroom skybox 400, the user can view at a desired rotation angle this same selected car on top of turntable 200.

Each of the disclosed portions of the invention: the interior panoramic images, the exterior panoramic images, the virtual environment, the graphic user interface elements are created as separate panoramic layers as a first layer, second layer, third layer, and continuing on. These panoramic layers are then brought together using gaming software such as unity to create a final product that can be then viewed as an interactive seamless environment using a Virtual Reality Headset.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

It is claimed:

1. A method for creating layered stereoscopic panoramic photography of a vehicle used in conjunction with graphic user interface elements, the method comprising:
   a. creating a first left panoramic layer using six stereo left images of a virtual showroom to form a left cube;
   b. creating a first right panoramic layer using six stereo right images of a virtual showroom to form a right cube;
   c. creating a second left panoramic layer of an interior of said vehicle using panoramic images of a left interior of said vehicle captured with a camera;
   d. creating a second right panoramic layer of said interior of said vehicle using panoramic images of a right interior of said vehicle captured with said camera;
   e. creating a third left panoramic layer of an exterior of said vehicle by taking photos of said vehicle as it rotates with said camera;
   f. creating a third right panoramic layer of said exterior of said vehicle by taking photos of said vehicle as it rotates with said camera;
   g. aligning and aiming a virtual camera at a center of said left cube and said right cube;
   h. using at least two said left panoramic layers, aligning said at least two left panoramic layers on a left front face of said left cube; and
   i. using at least two right panoramic layers, aligning said at least two right panoramic layers on a right front face of said right cube.

2. The method for creating layered stereoscopic panoramic photography in claim 1, further comprising: syncing a shutterbox script to a rotating anchor object.

3. A method for creating layered stereoscopic panoramic photography of a vehicle used in conjunction with graphic user interface elements, the method comprising:
   a. creating a first left panoramic layer using six stereo left images of a virtual showroom to form a left cube having portions of the virtual showroom;
   b. creating a first right panoramic layer using six stereo right images of a virtual showroom to form a right cube having portions of the virtual showroom;
   c. creating a second left panoramic layer of an interior of said vehicle using a set of left images captured with a camera;
   d. creating a second right panoramic layer of said interior of said vehicle using a set of right images captured with said camera;
   e. using at least two left panoramic layers, aligning said at least two left panoramic layers on a left front face of said left cube; and
   f. using at least two right panoramic layers, aligning said at least two right panoramic layers on a right front face of said right cube.

4. The method for creating layered stereoscopic panoramic photography in accordance with claim 3, wherein said virtual showroom contains a horizon wall, a turntable and a ramp.

5. The method for creating layered stereoscopic panoramic photography in accordance with claim 3, wherein said panoramic images are obtained from a 35 mm camera.

6. The method for creating layered stereoscopic panoramic photography in accordance with claim 5, wherein said 35 mm camera is controlled by a rig.

7. The method for creating layered stereoscopic panoramic photography in accordance with claim 3, further comprising: creating a third left panoramic layer of an exterior of said vehicle by taking a plurality of photos of said vehicle as it rotates at selected angles using panoramic images with said camera at a given height, lighting at a given intensity, and lens at a given diameter.

8. The method for creating layered stereoscopic panoramic photography in accordance with claim 3, further comprising: creating a third right panoramic layer of said exterior of said vehicle by taking a plurality of photos of said vehicle as it rotates at selected angles using panoramic images with said camera at a given height, lighting at a given intensity, and lens at a given diameter.

9. The method for creating layered stereoscopic panoramic photography of claim 7 wherein the plurality of photos numbers 36 photos.

10. The method for creating layered stereoscopic panoramic photography of claim 8 wherein the plurality of photos numbers 36 photos.

11. The method for creating layered stereoscopic panoramic photography in claim 1, wherein the panoramic images of the left interior of said vehicle and the panoramic images of the right interior of said vehicle are captured with said camera at a same given height, with lighting at a same given intensity, and with a lens at a same given diameter.

12. The method for creating layered stereoscopic panoramic photography in claim 1, wherein the panoramic images of the left interior of said vehicle and the panoramic images of the right interior of said vehicle are captured with said camera at a same selected angle.

13. The method for creating layered stereoscopic panoramic photography in claim 1, wherein the photos used for the third right panoramic layer of said exterior of said vehicle and the photos used for the third left panoramic layer of said exterior of said vehicle are captured with said camera at a same given height, with lighting at a same given intensity, and with a lens at a same given diameter.

14. The method for creating layered stereoscopic panoramic photography in claim 1, wherein the photos used for the third right panoramic layer of said exterior of said vehicle and the photos used for the third left panoramic layer of said exterior of said vehicle are captured with said camera at a same selected angle.

* * * * *